US008147703B2

(12) United States Patent
Remy

(10) Patent No.: US 8,147,703 B2
(45) Date of Patent: Apr. 3, 2012

(54) METHOD FOR PROCESSING SLUDGE

(75) Inventor: Marc Joseph Henri Remy, Nil-Saint-Martin (BE)

(73) Assignee: S.A. Lhoist Recherche et Developpement (BE)

( * ) Notice: Subject to any disclaimer, the term of this patent is extended or adjusted under 35 U.S.C. 154(b) by 327 days.

(21) Appl. No.: 12/312,204

(22) PCT Filed: Nov. 13, 2007

(86) PCT No.: PCT/EP2007/062296
§ 371 (c)(1),
(2), (4) Date: Apr. 29, 2009

(87) PCT Pub. No.: WO2008/058973
PCT Pub. Date: May 22, 2008

(65) Prior Publication Data
US 2011/0042319 A1    Feb. 24, 2011

(30) Foreign Application Priority Data

Nov. 14, 2006    (EP) ..................................... 06123985

(51) Int. Cl.
*C02F 11/14* (2006.01)
(52) U.S. Cl. .......... 210/725; 210/727; 210/733; 210/734
(58) Field of Classification Search ................... 210/710
See application file for complete search history.

(56) References Cited

U.S. PATENT DOCUMENTS

| 4,028,238 | A | * | 6/1977 | Allan | 210/711 |
| 4,160,731 | A | * | 7/1979 | Doyle | 405/129.25 |
| 4,479,879 | A | * | 10/1984 | Hashimoto et al. | 210/727 |
| 4,559,143 | A | * | 12/1985 | Asada et al. | 210/714 |
| 4,675,114 | A | * | 6/1987 | Zagyvai et al. | 210/666 |
| 5,616,283 | A | | 4/1997 | Huege et al. | 252/192 |
| 7,628,925 | B2 | * | 12/2009 | Remy et al. | 210/710 |

FOREIGN PATENT DOCUMENTS

| DE | 43 06 652 | 9/1994 |
| JP | 56 076293 | 6/1981 |
| JP | 61 092227 | 5/1986 |
| WO | WO/ 02092701 | 11/2002 |

* cited by examiner

Primary Examiner — Peter A Hruskoci
(74) Attorney, Agent, or Firm — Charles D. Gunter, Jr.

(57) ABSTRACT

The invention relates to a method for processing sludge, comprising the addition of a lime-based basic agent to a sludge having a first pH value in order to raise the pH to a second value higher than the first one, adding at least one anionic organic flocculating agent that is active at said second pH value, flocculating the sludge, and separating the flocculated sludge between dehydrated sludge and a liquid phase, wherein the sludge to be dehydrated has a first above-mentioned pH value lower than 9, while the lime-based basic agent induces said pH raise to said above-mentioned second value within less than 5 minutes. The invention also relates to a composition for implementing said processing.

14 Claims, 1 Drawing Sheet

METHOD FOR PROCESSING SLUDGE

The present invention concerns a method of treating sludge, comprising:

BACKGROUND OF THE INVENTION addition, to sludge having a first pH value, of a basic agent based on lime, with a view to raising the pH to a second value higher than the first, addition of at least one anionic organic flocculant, active at the said second pH value, flocculation of the sludge, and separation in the flocculated sludge between dewatered sludge and a liquid phase.

This method concerns the treatment in particular of organic or oily sludge.

Within the meaning of the present invention, organic or oily sludge means all sludge excluding mineral sludge according to the classification set out on pages 119 to 123 of the work incorporated here by reference: Water Technical Memorandum, 9th èd, éd du Cinquantenaire, Rueil-Malmaison: Degrémont, 1989, 2 vol. Among these organic or oily sludges there is found for example purification station sludge from urban water and food industries. Other sludge, possibly more acid, can also be envisaged. The initial pH of the sludge is below 9, often below 8.

In general terms, the sludge is first of all settled after being thickened. It is then subjected to an aggregation step, referred to a coagulation and/or flocculation, followed by dewatering, that is to say solid/liquid separation, carried out in the majority of cases by means of a belt filter, a filter press or a centrifugal settler. Apart from the reduction in volume, the purpose of this treatment is to facilitate handling, transportation and storage of this sludge.

Incorporation of a limy compound, generally lime, is often associated with the aforementioned treatment, in order to sanitise and stabilise the sludge (for long-term storage thereof, holding in heaps, etc) and to durably improve its properties for use (pelletabilty, expandability, etc) or with a view to enhancing its agronomic value [Acta 5th European Biosolids and Organic Residuals Conference, Wakefield (UK), November 2000, paper 66].

Quick lime means a mineral solid material the chemical composition of which is principally calcium oxide CaO. Quick lime contains impurities, namely compounds such as magnesium oxide MgO, silica $SiO_2$ or alumina $Al_2O_3$, etc, to the extent of a few percent. It should be understood that these impurities are expressed in the aforementioned forms but can in reality appear in different phases. In particular, what is expressed in the form of silica can in reality come for the major part from silicates.

Slaked lime or hydrated lime means a set of solid particles, mainly in the form of calcium hydroxide $Ca(OH)_2$, obtained by "extinction", sometimes referred to as "hydration", of quick lime with water. This slaked lime can obviously contain the aforementioned impurities, issuing from quick lime.

Milk of lime means an aqueous suspension manufactured initially from quick lime or hydrated lime.

Organic and anionic flocculant means an anionic polymer having a molecular weight above 500,000 Da, preferably above 1,000,000 and more preferably above 5,000,000. Generally polymers are classified according to their length of chain, namely short-chain polymers and long-chain polymers. Typically short-chain polymers have an average molecular weight from a few thousands to a few tens of thousands of Da. Their size enables them to infiltrate between other molecules, which confers a dispersant character on them. Long-chain polymers have a molecular weight ranging from a few tens of thousands to a few millions of Da. The long chain enables them to "bridge" other molecules, which confers a flocculant character on them.

The lime can be added to the sludge before (pre-liming) or after (post-liming) the aforementioned dewatering step.

Apart from the fact that post-liming constitutes an additional mixing step in the sludge treatment process, this additional operation has several drawbacks, including destructuring of the sludge, the difficulty of mixing the lime with the dewatered sludge and, consequently non-homogeneity of the distribution of the lime in the medium.

All these reasons have led to the addition of lime by pre-liming, before dewatering, being envisaged.

The aforementioned aggregation is generally facilitated by the addition of a coagulating agent, including iron or aluminium salts, as proposed in the application WO 2006/030102. However, the use of these salts has many drawbacks, including the significant increase in the quantity of dry matter in the sludge, an attack on almost all metals, including stainless steels, because of their highly corrosive character, and danger for the operators, because of the irritant or even toxic character of the sludge given off by these salts during handling.

In order to overcome these drawbacks, it has become common practice to facilitate flocculation by means of organic compounds; in this case, the use of cationic flocculants is generally adapted to the treatment of organic sludge.

However, cationic polymers in general degrade rapidly from a pH of 9 to 10, as indicated in the prior art of the patent EP 1 154 958 B1. In many cases, the pre-liming operation can then not be carried out just before flocculation since the cationic polymer does not have time to act before the pH of the sludge reaches a critical value as from which deflocculation appears, because of the addition of lime. The aforementioned European patent EP 1154958 and the international patent application WO2005/014495, in particular, therefore proposed to resolve this problem by using specific lime or lime/magnesium compounds, which produce an increase in pH of the sludge that is sufficiently delayed for the cationic polymer to have the time to act as a flocculant before the solid/liquid separation. However, the aforementioned specific compounds are not suited to all cases of application.

This is because, in practice, the maintenance after liming, until the end of flocculation, of a pH at a value below that causing degradation of cationic organic flocculant will depend on the throughput of lime, the level of delayed basicity of the lime used, the proportion of dry matter and the buffering capacity of the liquid sludge. Given that, under industrial conditions, the proportion of dry matter and the buffering capacity of the sludge can fluctuate fairly greatly, the use of these processes using lime with delayed basicity sometimes appears tricky. Another disadvantage of the use of cationic organic flocculant in association with lime is the emission of volatile amines, an emission promoted at a high pH (CHANG, J.; ABU-ORF, M.; DENTEL, S., Alkylamine odors from degradation of flocculant polymers in sludges, Water Research, 2005, 39(14), pp. 3369-3375). Finally, the use of compounds delaying the rise in pH leads to an intentional extension of the combined flocculation and pre-liming step, not compatible with certain continuous dewatering processes.

Moreover, the application WO 09605142 proposes a method as indicated at the start. This method provides for a flocculation not of sludge but of a flow of waste water having a pH above 10.2, comprising an increase in its pH to a value above 10.2 if such is not the case initially, an addition of Mg ions and vigorous mixing with a highly anionic flocculant with a high molecular weight. The increase in pH can take place either through MgO, lime or sodium hydroxide. In a similar fashion, the application JP-54025268 describes a sludge flocculation method comprising the addition of an alkali NaOH or KOH, with a view to obtaining a pH above 10, followed by an addition of $CaCl_2$ and next the addition of an anionic and/or non-ionic flocculant. These two methods require several steps, in particular an increase in the pH of the sludge beyond 10, and then the addition of Mg or $CaCl_2$, prior to the addition of the anionic flocculant, which considerably extends the duration of the treatment of the sludge or reduces the flocculation time.

In the application JP-A-04-040286, an application to fishery sludge of an water-soluble calcium compound is provided and, before or after this application, addition of an organic flocculant, the latter being able to be cationic, anionic or non-ionic. In this case only the pH of the aqueous phase is taken into consideration, recommending neutralisation by an acid thereof after the addition of a basic calcium compound. In all the given examples, the sludge treated is initially highly basic and neutralisation always occurs after the application of the calcium compound and the addition of the organic flocculant. Use is made, as a calcium compound, either of highly basic compounds of the lime type or of calcium salts such as halides, nitrate or acetate. The objective sought is a purified water, resulting from the treatment of the sludge.

SUMMARY OF THE INVENTION

The present invention aims to overcome the drawbacks of the aforementioned prior art by providing a method that allows the treatment of sludge that is simple, rapid and preferably continuous, the number of successive steps of which will be as limited as possible, the purpose being to obtain as complete a flocculation as possible and a homogeneous dewatered sludge having the best properties in terms of sanitisation, stabilisation and other properties of use.

To resolve these problems, the present invention provides a sludge treatment method as indicated at the start in which the sludge to be dewatered has, as the aforementioned first pH value, a value of less than 9, and the basic agent based on lime causes the said rise in pH up to the said aforementioned second value in less than 5 minutes.

The sludge treatment method according to the invention resolves the problems of the duration of flocculation associated with pre-liming, and/or makes it possible to reduce the quantity of flocculant to be added in particular in comparison with the use of cationic flocculants. Moreover, the number of sludge treatment steps according to the invention is limited, while proposing a simple and rapid method, adapted to a wide range of applications, which affords a gain in dryness in the dewatered sludge. This dewatered sludge according to the invention has all the properties expected of a limed sludge, in terms of sanitisation and stabilisation for long-term storage (holding in heaps, etc) and durable improvement of its properties for use (pelletability, expandability, etc) or increase in its agronomic value.

DETAILED DESCRIPTION OF THE INVENTION

Figure 1:
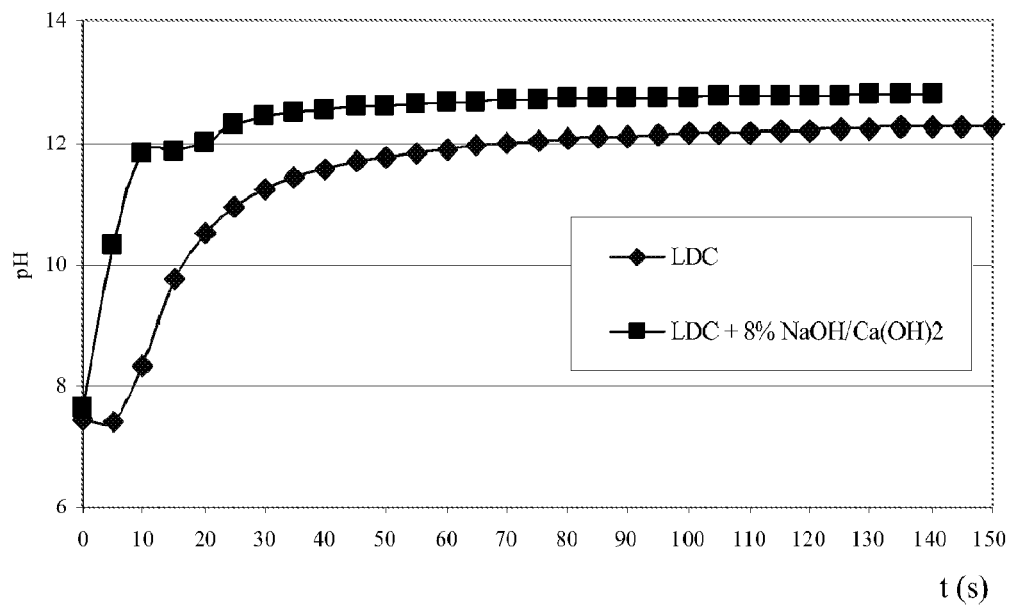
FIG. 1 shows the change in the pH of the purification sludge after the addition of lime, the pH change being recorded until values above 12 are obtained.

This treatment is therefore a sludge treatment by pre-liming.

The anionic flocculants appear inactive for the flocculation of organic sludge at pH values of less than 10, in particular 11, or even 12.

According to the invention the problem of the inactivity of the anionic flocculants is solved by the addition to the sludge to be dewatered, which has a pH value of less than 9, in particular less than 8, of a basic agent based on lime capable of producing a rapid increase in the pH beyond 11, preferably 12, so as to allow a complete flocculation by the anionic flocculant that has become active, before the solid/liquid separation step (dewatered). For this purpose, the increase in pH must take place sufficiently rapidly (less than 5 minutes, preferably less than 3 minutes, advantageously less than 2 minutes or even less than 1 minute), so that the dewatering can commence in a short time following the addition of the lime-based basic agent and anionic flocculant, while allowing satisfactory flocculation of the sludge.

The method, by providing the use of anionic flocculant, removes the drawback of the premature degradation of the flocculants, usually encountered when cationic flocculants are applied.

The method provides for the basic agent based on lime and the said at least one flocculant to be intended for an application to sludge that is simultaneous or a separate in time. The order of introduction is not critical. The addition of lime can be provided just as well before, simultaneously with or after the flocculant, preferably before.

Thus the sludge treatment method according to the invention allows treatment in a limited number of steps; after the possible initial step of settling/thickening generally carried out, only a step of adding and mixing the flocculant, with which the addition of the basic agent based on lime is associated, occurs, followed by the dewatering step (solid/liquid separation). No other prior step, intermediate or subsequent, is necessary, since the liming is combined with the flocculation step. Moreover, the solid after dewatering has all the advantages expected of a limed sludge, in terms of homogeneity, sanitisation, handling and stabilisation for long-term storage (holding in heaps, etc) and durable enhancement of its properties for use (pelletability, expandability, etc) or increase in its agronomic value.

It is important for the increase in pH of the sludge to be rapid, so as to reduce as far as possible the duration of the flocculation step prior to the dewatering and to allow in particular a solid/liquid separation continuously, in particular by means of centrifuges or belt filters.

According to an invention, the flocculation of the sludge, in particular organic or oily, is carried out with, as a flocculant, an anionic polymer having a molecular weight greater than 500,000 Da, preferably greater than 1,000,000 Da, more preferably between $5.10^6$ and $35.10^6$ Da and most preferably between $15.10^6$ and $30.10^6$ Da; and the pre-liming associated with the flocculation step is carried out by addition of the basic agent based on lime according to the invention.

According to one advantageous embodiment of the invention, the basic agent based on lime is chosen from the group consisting of lime in quick form, in powdery partially or totally slaked form or in slaked form in suspension in a aqueous phase which requires, to reach a pH of 12 in an aqueous solution of $NH_4Cl/(NH_4)_2PO_4$ having an initial pH of 7.5, a time $t_{pH12}$ equal or less than 90 seconds, preferably equal to or less than 60 seconds, the procedure for determining the $t_{pH12}$ being as follows:

13.24 g of $NH_4Cl$ and 3.465 g of $(NH_4)_2HPO_4$ are dissolved in 1 liter of deionised water.

200 g of the solution of $NH_4Cl/(NH_4)_2PO_4$ are introduced into a 500 cm3 beaker and maintained under mechanical agitation at 400 revolutions per minute. A pH electrode is then placed in this solution, which makes it possible to record the change in pH over time.

1.2 g of powder lime or the equivalent in solid matter in the case of milks of lime is weighed and introduced into the solution of $NH_4Cl/(NH_4)_2PO_4$.

The initial pH of the solution is 7.5 and, after the addition of the lime, changes up to a value greater than 12.

The test is considered to be ended when the pH stabilises.

The operation is repeated a second time and the average time for reaching a pH of 12, a parameter denoted $t_{pH12}$, is determined on the basis of the two curves obtained.

Such limes can be termed accelerated-basicity limes, in contradistinction to delayed-basicity limes generally applied in the prior art. The milk of lime form allows in particular an easy intimate mixing with the sludge to be treated.

As a lime according to the invention, limes can advantageously be provided both in powder form and in suspension, which are formed from particles having a $d_{50}$ equal to or less than 30 μm, preferable equal to or less than 20 μm.

Preferentially the lime is a partially slaked quick lime, having a proportion of slaked lime, or hydration level, situated between 1 and 20% by weight. Preferentially, all the particles in such a lime have a size of less than 500 μm, preferably 100 μm.

According to an improved embodiment of the invention, the lime is a partially slaked quick lime or a milk of lime with an alkali metal hydroxide content. Preferably this lime contains a proportion of alkali metal hydroxide >0 and <10% by weight. Preferably NaOH or KOH is provided as an alkali metal hydroxide.

It appears in fact that the addition to any sludge of a milk of lime containing a low proportion, in principle less than 10% by weight with respect to $Ca(OH)_2$, of alkali hydroxide, in particular NaOH or KOH, give rise to an even more rapid increase in the pH of the medium than the corresponding milk of lime without alkali hydroxide added.

In addition and unpredictably, the dewatered sludge issuing from a pre-liming by a milk of lime doped with alkali hydroxide has in the end a dry matter content greater than that obtained under the same treatment conditions but with a corresponding undoped milk of lime. This gain in dryness is important since it improves overall the efficacy of the treatment of the sludge and of the liming.

According to the invention the said at least one anionic organic flocculant can be chosen for example from the group consisting of polyelectrolytes based on polymer or copolymers of acrylic acid, acrylates, acrylamide and mixtures thereof. Unexpectedly, the method according to the invention for the treatment of sludge, in particular organic or oily, makes it possible to obtain the dewatering of a sludge by having recourse to an addition of anionic flocculant appreciably less than, in a similar case, by means of a cationic flocculant of the prior art. In general, for a given sludge and fixed dewatering result, the consumption of anionic flocculant is reduced by approximately ½ to ⅔, compared with the consumption of cationic flocculant.

Other embodiments of the method according to the invention are indicated in the accompanying claims.

The invention will now be described in more detail by means of non-limitative examples. These examples mention a milk of lime with 20% dry matter, by putting 200 g of slaked lime $(Ca(OH)_2)$ in suspension under agitation in 0.8 $dm^3$ of water. Milks of lime activated with soda are obtained at the start of the aforementioned milk by adding NaOH in flakes under agitation, at the rate of 2.5 g, 6.3 g and 15.9 g. The percentages by weight of NaOH with respect to $Ca(OH)_2$ (% $NaOH/Ca(OH)_2$) of three milks of lime are respectively 1.3%, 3.2% and 8% and their theoretical pH 13.5, 13.9 and 14.3.

The anionic organic flocculant used in the examples is marketed under the trade name "OPTIFLOC 4% anion" by Kemira Chemicals SA. It is also possible for example to use the polymers EM 630 and EM 635 available from SNF Floerger®.

In the following examples, unless indicated to the contrary, the percentages are expressed by weight.

EXAMPLE 1

An industrial purification sludge having a dry matter (DM) content of 1% is treated according to the invention by the addition of milk of lime and an anionic flocculant and then dewatered according to a procedure simulating dewatering in a centrifuge. The dose of flocculant is 0.9% of active matter with respect to the dry matter content of the sludge to be treated. The dose of lime, compared as a $Ca(OH)_2$ equivalent with respect to DM, is 20.5%.

According to the preferred embodiment of the invention, this operation is repeated by replacing the milk of lime with milk of lime with NaOH added as described above and containing 3.2% of NaOH with respect to $Ca(OH)_2$, By way of comparison, the treatment is implemented on a third occasion, but this time without the addition of milk of lime. The flocculation takes place with cationic flocculant, as recommended in the prior art, used at the minimum dose for obtaining a drainable floc, that is to say 3.1% of active matter with respect to DM.

The dry matter results after dewatering (DMAD % column) and the reduction in the quantity of sludge (Q2−Q1)/Q1, which theoretically assesses the effect of the addition of the milk of lime to the quantity of sludge produced, are set out in table 1. Q1 represents the quantity of sludge produced without the addition of lime and Q2 the quantity of sludge produced when the lime is added before dewatering. The type of milk of lime, the type of flocculant, the dose of flocculant and the dose of lime used for each test are also presented in this table.

In the context of this example, the use according to the invention of milk of lime and milk of lime with NaOH added makes it possible to divide by three the dose of flocculant to be used for flocculation and reduces the quantities of sludge. Moreover, the reduction in the quantity of sludge is greater when milk of lime with NaOH added is used (9.1% instead of 5.6%).

TABLE 1

| Type of milk of lime | Type of flocculant | Dose of flocculant % active mat./DM | Dose of lime % $Ca(OH)_2$/DM | DMAD % | Q2-Q1/Q1 |
|---|---|---|---|---|---|
| Without | cationic | 3.10% | | 14.1% | |
| MOL at 20% according to the invention | anionic | 0.90% | 20.5% | 18.0% | −5.6% |

TABLE 1-continued

| Type of milk of lime | Type of flocculant | Dose of flocculant % active mat./DM | Dose of lime % Ca(OH)$_2$/ DM | DMAD % | $\frac{Q2-Q1}{Q1}$ |
|---|---|---|---|---|---|
| MOL at 20% + 3.2% NaOH/ Ca(OH)$_2$ according to the invention | ionic | 0.90% | 20.5% | 18.7% | −9.1% |

MOL = milk of lime
DM = dry matter of the sludge before treatment
DMAD = dry matter after dewatering

EXAMPLE 2

An urban purification sludge having a dry matter content of 4.1% is treated according to the invention with milk of lime containing 1.3% NaOH with respect to Ca(OH)$_2$ and flocculated by means of an anionic flocculant and then dewatered as in example 1.

This operation is repeated using either milk of lime containing 3.2% of NaOH/Ca(OH)$_2$ or milk of lime containing 8% NaOH/Ca(OH)$_2$.

By way of comparison, the treatment of the sludge is carried without the addition of milk of lime. In the latter case the flocculation is performed with cationic flocculant used at the minimum dose for obtaining a drainable floc.

The results are set out in table 2, in a similar fashion to table 1. The type of milk of lime, the type of flocculant, the dose of flocculant and the dose of lime used for each test are also presented in this table.

In the context of this example, the use of milk of lime with NaOH added makes it possible to divide by two the dose of flocculant to be used for the flocculation and reduces the quantities of sludge by 4% to 6%. This reduction is all the greater, the higher the quantity of soda added to the milk of lime.

TABLE 2

| Type of milk of lime | Type of flocculant | Dose of flocculant % active mat./DM | Dose of lime % Ca(OH)$_2$/ DM | DMAD % | $\frac{Q2-Q1}{Q1}$ |
|---|---|---|---|---|---|
| Without | cationic | 1.05% | | 21.4% | |
| MOL at 20% + 1.3% NaOH/ Ca(OH)$_2$ according to the invention | anionic | 0.53% | 30.0% | 28.9% | −3.7% |
| MOL at 20% + 3.2% NaOH/ Ca(OH)$_2$ according to the invention | anionic | 0.53% | 30.0% | 29.0% | −4.1% |
| MOL at 20% + 8% NaOH/ Ca(OH)$_2$ according to the invention | anionic | 0.53% | 30.0% | 29.7% | −6.3% |

EXAMPLE 3

The urban purification sludge having a dry matter content of 3.5% is treated according to the invention with a 30% dose of Ca(OH)$_2$/DM either by means of a milk of lime with 20% DM or with a milk of lime activated by means of NaOH at the rate of 8% NaOH/Ca(OH)$_2$. The change in the pH of the purification sludge after the addition of lime is then recorded until values above 12 are obtained and shows very clearly the more rapid rise in pH of the sludge treated with milk of lime activated with soda. In this case flocculation with an anionic flocculant can take place already 30 seconds after liming whereas, when non-activated milk of lime is used, this period is at a minimum 80 seconds.

EXAMPLE 4

Figure 2:
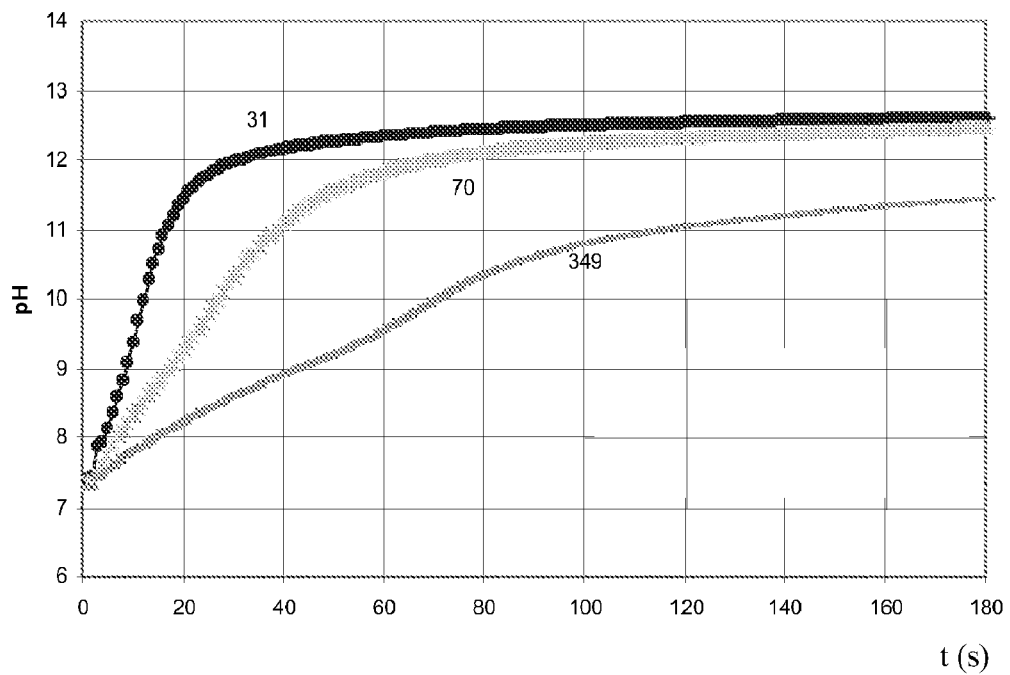
FIG. 2 shows the effect of the type of quick lime used on the time necessary for obtaining a pH above 12 in the treated sludge.

An urban purification sludge having a dry matter content of 3.1% is treated with a 30% dose of lime/DM either with a defillerised quick lime corresponding to the prior art and having a $t_{pH12}$ of 330 s, or according to the invention with a high-reactivity quick lime, having a Ht$_{pH12}$ of 44 s, or with a partially slaked quick lime having a hydration level of 10% and a $t_{pH12}$ of 28 s. FIG. 2 presents the changes in pH obtained.

The time period necessary for obtaining a pH above 12 in the treated sludge is much greater than 5 minutes (349 s) in the case of the quick lime according to the prior art. This time is on the other hand much less than 2 minutes in the case of the two quick limes according to the invention (respectively 31 s and 70 s). Only these two products will allow according to the invention the flocculation of sludge with an anionic flocculant upstream of the most usual continuous dewatering methods.

EXAMPLE 5

An urban purification sludge having a dry matter content of 3.3% is treated with a 50% soda solution with a view to increasing the pH thereof to a value above 12. Flocculation tests on this sludge at a pH greater than 12 are formed by the addition of increasing doses of a solution of anionic flocculant with 3 g/dm$^3$ of active matter. Despite the use of a maximum dose of 5%/DM of active matter of anionic flocculant, flocculation of the sludge does not take place.

EXAMPLE 6

An urban purification sludge having a dry matter content of 3.3% is treated according to the invention with the two quick limes according to the invention, used in example 4. It is flocculated with anionic flocculant, left to stand for 15 minutes and dewatered according to a procedure simulating dewatering in a centrifuge.

By way of comparison, this operation is repeated without the addition of lime or by adding before flocculation defillerised quick lime according to the prior art, used in example 4. In the last two cases, the flocculation is performed with cationic flocculant, used at the minimum dose for obtaining a drainable floc.

The results are set out in table 3. The floc obtained after the addition of defillerised quick lime altered during the 15 minutes preceding the dewatering step. For this variant of the example, the DMDA and the ratio (Q2−Q1)/Q1 could not be established. On the other hand the use of quick limes according to the invention gives a stable floc during the standing period before dewatering, makes it possible to divide by approximately two the dose of flocculant to be used and results in a slight reduction in the quantity of sludge produced.

TABLE 3

| Type of milk of lime | $t_{pH 12}$ | Type of flocculant | Dose of flocculant % active mat./DM | Dose of lime % Ca(OH)$_2$/ DM | DMAD % | $\frac{Q2-Q1}{Q1}$ |
|---|---|---|---|---|---|---|
| Without | | cationic | 1.00% | | 23.2% | |
| Defillerised quick lime | 330 s | cationic | 1.05% | 30.0% | — | — |
| High-reactivity quick lime according to the invention | 44 s | anionic | 0.50% | 30.0% | 32.3% | −0.5% |
| Partially slaked quick lime according to the invention | 28 s | anionic | 0.50% | 30.0 | 32.0% | −0.2% |

All these examples perfectly illustrate the advantages of the sludge treatment method according to the invention as well as sludges treated according to the invention.

It must be understood that the present invention is in no way limited to the embodiments described above and that many modifications can be made thereto without departing from the scope of the accompanying claims.

The invention claimed is:

1. Sludge treatment method, comprising
addition, to a sludge having a first pH value below 9, of a basic agent based on lime, with a view to raising the pH to a second value higher than the first,
addition of at least one anionic organic flocculant, active at the said second pH value, wherein said anionic organic flocculant is an anionic polymer having a mean molecular weight greater than 500,000 Da,
flocculation of the sludge, and
separation in the flocculated sludge between dewatered sludge and a liquid phase; and
characterized in that the basic agent based on lime to add to the sludge having said first pH value below 9 is chosen from the group consisting of lime in quick form, in partially or totally powdery slaked form or in slaked form in suspension in an aqueous phase that requires, in order to reach a pH of 12 by introducing said basic agent into an aqueous solution of $NH_4Cl/NH_4)/2HPO_4$ having an initial pH of 7.5, a time $t_{pH12}$ equal to or less than 90 seconds, in order to cause said rise in pH of the sludge up to the aforementioned said second value in less than 5 minutes wherein said second value is equal to or greater than 11, and wherein said basic agent based on lime is accelerated basicity lime containing a proportion of alkali metal hydroxide.

2. Method according to claim 1, characterized in that the said rise in pH lasts for less than 3 minutes.

3. Method according to claim 1, characterized in that the addition of the basic agent based on lime and the addition of the said at least one anionic organic flocculant take place simultaneously.

4. Method according to claim 1, characterized in that the aforementioned limes are formed by particles having a $d_{50}$ equal to or less than 30 μm.

5. Method according to claim 1, characterized in that the lime is a partially slaked quick lime having a proportion of slaked lime situated between 1% and 20% by weight.

6. Method according to claim 1, characterized in that the lime contains a proportion >0 and <10% of alkali metal hydroxide by weight.

7. Method according to claim 1, characterized in that the said at least one organic flocculant is chosen from the group consisting of polyelectrolytes based on polymers of copolymers of acrylic acid, acrylate, acrylamide and mixtures thereof.

8. Method according to claim 1, in which the said anionic organic flocculant is an anionic polymer having a mean molecular weight greater than 1,000,000 Da.

9. Method according to claim 1, in which the said anionic organic flocculant is an anionic polymer having a mean molecular weight between $5.10^6$ and $35.10^6$ Da.

10. Method according to claim 1, in which the said anionic organic flocculant is an anionic polymer having a mean molecular weight between $15.10^6$ and $30.10^6$ Da.

11. Method according to claim 1, characterized in that the said second pH value is equal to or greater than 12.

12. Method according to claim 1, characterized in that the said rise in pH lasts for less than 2 minutes.

13. Method according to claim 1, characterized in that the said rise in pH lasts for less than 1 minute.

14. Method according to claim 1, characterized in that the addition of the basic agent based on lime and the addition of the said at least one anionic organic flocculant take place separate in time.

* * * * *